3,539,631
Patented Nov. 10, 1970

3,539,631
NEW NAPHTHYL- AND TETRAHYDRO-
NAPHTHYL FORMAMDINES
Laszlo Pallos, Julianna Rosdy, nee Kiss, Pal Benko, and Ferenc Ordogh Budapest, Hungary, assignors to Egyesult Gyogyszer-es Tapszergyar, Budapest, Hungary
No Drawing. Filed May 24, 1967, Ser. No. 640,806
Claims priority, application Hungary, May 25, 1966, EE–1,250
Int. Cl. C07c *123/00*
U.S. Cl. 260—566  3 Claims

ABSTRACT OF THE DISCLOSURE

Novel naphthyl and tetrahydronaphthyl formamidine derivatives and therapeutically acceptable acid addition salts thereof are useful as anthelmintics and also as antifungal and antibacterial agents.

---

The present invention relates to new naphthyl- and tetrahydronaphthyl formamidine derivatives having anthelmintic and antibacterial activity and to the salts and quaternary ammonium derivatives thereof.

Some naphthyl formamidines have already been described in the literature, e.g. the N,N'-bis($\alpha$- and $\beta$-naphthyl)-formamidine (J. Pharm. Soc. Japan. 74, p. 135, 1954; Am. Chem. J. 13, p. 516, 1891; J. Am. Chem. Soc. 31, p. 1148, 1909; Agnew. Chem. 1963, p. 825 etc), the N - ($\alpha$-naphthyl)-N,N'-dimethyl-formamidine (J. Prakt. Chem. 13, p. 265, 1961; Chem. Ber. 92, p. 837, 1959), and the N-benzhydryl-N'-2-naphthyl-formamidine (J. Chem. Soc. 1935, p. 1219). The bis-naphthyl-formamidines are used as stabilizers in certain unsaturated polyester and styrene mixtures (cf. U.S. Pat. 2,846,411). These compounds are valuable intermediates and can be used in different ways in many organic syntheses.

Compounds of these types can be prepared by reacting the corresponding naphthylamines with equimolecular amounts of orthoformate esters (J. Am. Chem. Soc. 31, p. 1148, 1909), or by reacting naphthyl-iso-cyanates with dialkyl formamides (J. Prakt. Chem. 13, p. 265, 1961). The N-naphthyl-N,N'-dimethyl-formamidine has also been prepared by reacting the corresponding naphthylamine in benzene with a mixture of dimethyl formamide and phosphorus oxychloride (Chem. Ber. 92, p. 837, 1959). A known synthesis of N,N'-dinaphthyl formamidines comprises reacting the corresponding naphthylformimino methyl ether with $\alpha$-naphthylamine (Am. Chem. J. 13, p. 516, 1891). This method is the starting point of the present invention and has been developed further to extend it to the preparation of new, hitherto unknown naphthyl and tetrahydronaphthyl formamidines.

The new compounds of the present invention can be characterized by the general formula

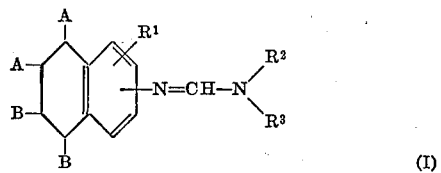

(I)

wherein the pairs of symbols A, A and B, B are hydrogen atoms or additional chemical bonds; $R_1$ is hydrogen, halogen, hydroxyl or a sulfonic acid group; $R_2$ and $R_3$ are independently selected from the group consisting of hydrogen, an alkyl group of 2 to 12 carbon atoms, diethylaminoethyl, diethylaminopropyl, cyclohexyl and cyclooctyl; and one of $R_2$ and $R_3$ can be a heterocyclic radical selected from the group consisting of furfuryl, pyridyl, piperidyl, 3-methylpiperidyl, pyrryl, piperazinyl, and hexamethyleneimino or $R_2$ and $R_3$ form, together with the nitrogen to which they are attached, a piperidyl, piperazinyl, pyridyl, pyrryl or azocinyl group; and the therapeutically acceptable acid addition salts thereof.

These new compounds are prepared by reacting a N-naphthyl or N-tetrahydronaphthyl formimino ether of the formula:

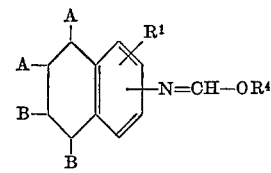

(II)

wherein A, B, $R^1$ are as defined above, and $R^4$ is an alkyl or aralkyl group, with an amine of the formula:

(III)

wherein $R^2$ and $R^3$ are as defined.

The reaction of the formimino ethers of the Formula II with the amines of Formula III may be performed in polar or non-polar solvents or even in the absence of solvents, at temperatures of 50° to 200° C., usually at the boiling point of the reaction mixture; working at room temperature or at a slightly elevated temperature may be in some cases also satisfactory. The presence of an excess of the amine of Formula III may in some cases exert a favorable effect on the yield of the reaction; in general, however, the reactants are employed in nearly equimolecular proportions.

The obtained formamidines of the Formula I can be purified in accordance with their physical properties, by recrystallization or by fractional distillation in vacuo.

The pure compounds of the Formula I may be converted to therapeutically acceptable salts by reacting with a mineral or organic acid; the quaternary derivatives, which may be equally useful in therapy, can be prepared by reacting the bases with a lower alkyl-halide.

The formamidines of Formula I, as well as the acid addition salts and quaternary ammonium derivatives thereof may be used alone or in combination with other biologically active substances and with the usual pharmaceutical vehicles and other adjuvants, for the preparation of pharmaceutical compositions.

Some N-naphthyl and N-tetrahydronaphthyl formamidine derivatives of the invention have excellent anthelmintic activity in experiments carried out with the ringworms *Tubifex rivularium* and *Enchytraeus albidus*. Other derivatives, especially those containing longer alkyl chains or cycloalkyl groups, also have a very marked antibacterial and antifungal activity against different bacteria, gram-positive cocci, non-sporulating and aero sporulating bacteria and fungi. The results of these experiments show that the antibacterial and antifungal activity is, in many cases, at least similar or superior to those of chloramphenicol (threo - 1-p-nitrophenyl-2-dichloroacetaminopropane-1,3-diol) or of 2 methyl-5,7-dichloro-8-hydroxyquinoline used as comparative substances.

The invention is further illustrated by the following examples, without being in any way limited to them.

EXAMPLE 1

Into a flask equipped with a mixer and a reflux condenser, there are charged 19.9 g. (0.1 mole) of N-($\alpha$-naphthyl)-formimino ethyl ether and a solution of 12.7 g. (0.1 mole) of p-chloroaniline in 200 ml. of absolute toluene. The obtained solution is refluxed for 6 hours, then clarified with charcoal, filtered and the solvent distilled off in vacuo. The residual oil is inoculated with a crystal and thus crystallized. The crude product may be recrystallized from ethanol.

The N-(α-naphthyl)-N'-(p-chlorophenyl)-formamidine melts at 145–146° C. Its hydrochloride salt may be prepared by treating the ethanolic solution of the base with dry hydrogen chloride gas; M.P. 228–230° C.

*Analysis.*—Calculated for $C_{17}H_{14}Cl_2N_2$ (317.19) (percent): N, 8.83; Cl, 22.4. Found (percent): N, 8.95; Cl, 22.55.

EXAMPLE 2

4.98 g. (0.025 mole) of N-(β-naphthyl)-formimino ethyl ether and 3.19 g. (0.0251 mole) of cyclooctyl amine are dissolved in 50 ml. of absolute toluene. The solution is refluxed for 4 hours, then treated with charcoal and filtered while hot. To the obtained pale yellow solution is added under cooling dropwise an ethanolic hydrochloric acid solution and then the mixture is evaporated to dryness in vacuo. The obtained crude N-(β-naphthyl)-N'-cyclooctyl-formamidine-hydrochloride is dissolved in hot ethanol; ethyl acetate is then added to the solution, and the mixture is cooled under occasional stirring. The obtained crystalline product is filtered and dried; M.P. 151–152° C.

*Analysis.*—Calculated for $C_{19}H_{25}ClN_2$ (316.87), (percent): N, 8.82; Cl, 11.2. Found (percent): N, 9.10; Cl, 11.0.

EXAMPLE 3

5 g. (0.027 mole) of N-(α-naphthyl)-formimino ethyl ether and 2.29 g. (0.027 mole) of piperidine are dissolved in 40 ml. of toluene. The solution is refluxed for 3 hours, then treated with charcoal while hot and filtered. The solvent is distilled off in vacuo. The obtained oil is kept in an icebox overnight; the crystallized N-(α-naphthyl)-N'-piperidyl-(1)-formamidine melts at 54–55° C.

*Analysis.*—Calculated for $C_{16}H_{18}N_2$ (238.32) (percent): N, 11.75. Found (percent): N, 11.55.

EXAMPLE 4

10 g. (0.054 mole) of N-(α-naphthyl)-formimino methyl ether and 7.0 g. (0.0542 mole) of n-octylamine are dissolved in 120 ml. of absolute benzene. The mixture is refluxed for 4.5 hours, then treated with charcoal while hot and filtered. The solvent is distilled off; a greenish oil remains which crystallizes quickly on cooling. The obtained N-(α-naphthyl)-N'-(n-octyl)-formamidine melts at 52–53° C.

*Analysis.*—Calculated for $C_{19}H_{26}N_2$ (282.42) (percent): N, 9.89. Found (percent): N, 9.774.

EXAMPLE 5

4.98 g. (0.025 mole) of N-(β-naphthyl)-formimino ethyl ether and 2.5 g. (0.0252 mole) of hexamethyleneimine are dissolved in 50 ml. of absolute toluene. The further procedure is similar to that of Example 4. The obtained N-(β-naphthyl)-hexamethyleneimino-(1)-azomethine boils under 0.2 mm. mercury pressure at 180–182° C.

*Analysis.*—Calculated for $C_{17}H_{20}N_2$ (252.35) (percent): N, 11.1. Found (percent): N, 11.0.

EXAMPLE 6

4.98 g. (0.025 mole) of N-(β-naphthyl)-formimino ethyl ether and 2.7 g. (0.252 mole) of benzyl amine are reacted in 70 ml. of dioxane. The further procedure is similar to that of Example 3. The obtained N-(β-naphthyl)-N'-benzylformamidine melts at 141–142° C.

*Analysis.*—Calculated for $C_{17}H_{16}N_2$ (250.33) (percent): N, 10.75. Found (percent): 10.86.

EXAMPLE 7

10 g. (0.054 mole) of N-(α-naphthyl)-formimino methyl ether and 5.24 g. (0.054 mole) of furfuryl amine are dissolved in 40 ml. of absolute xylene. The solution is refluxed for two hours, treated with charcoal while hot and filtered. The solvent is distilled off under reduced pressure and the residue is fractionated. The obtained N-(α-naphthyl)-N'-furfuryl-formamidine boils under 0.4 mm. mercury pressure at 124–126° C.

*Analysis.*—Calculated for $C_{16}H_{14}N_2O$ (250.32) (percent): N, 11.22. Found (percent): N, 10.63.

EXAMPLE 8

10 g. (0.0502 mole) of N-(α-napthyl)-formimino ethyl ether and 5.82 g. (0.0505 mole) of n-heptyl amine are reacted in 100 ml. of absolute toluene, as described in Example 2. The obtained N-(α-naphthyl)-N'-(n-heptyl)-formamidine hydrochloride melts at 278–280° C.

*Analysis.*—Calculated for $C_{18}H_{25}ClN_2$ (304.86), (percent): N, 9.18; Cl, 11.63. Found (percent): N, 9.26; Cl, 11.55.

EXAMPLE 9

4.98 g. (0.025 mole) N-(α-naphthyl)-formimino ethyl ether and 3.29 g. (0.0253 mole) of 3-diethylamino-propyl-amine are reacted in 70 ml. of absolute toluene according to the procedure described in Example 2. The obtained N-(α-naphthyl)-N'-(3-diethylamino-propyl)-formamidine dihydrochloride melts at 280–282° C.

*Analysis.*—Calculated for $C_{18}H_{27}Cl_2N_3$ (356.33), (percent): Cl, 19.9. Found (percent): Cl, 19.62.

EXAMPLE 10

10 g. (0.054 mole) of N-(α-napthyl)-formimino methyl ether and 6.70 g. (0.0544 mole) p-anisidine are boiled for three hours in absolute benzene. The further procedure is similar to that of the Example 4. Obtained N-(α-naphthyl)-N'-(p-anisyl)-formamidine melts at 163–165° C.

*Analysis.*—Calculated for $C_{18}H_{16}N_2O$ (276.33), (percent): N, 10.02. Found (percent): N, 9.98.

EXAMPLE 11

A mixture of 5 g. (0.027 mole) of N-(α-naphthyl)-formimino ethyl ether, 4.34 g. (0.027 mole) of m-amino-benzotrifluoride and 40 ml. of absolute toluene is reacted as described in Example 4. The obtained N-(α-naphthyl)-N'-(m-trifluormethyl-phenyl)-formamidine may be purified by recrystallizing from ethanol. M.P. 190–192° C.

*Analysis.*—Calculated for $C_{18}H_{13}F_2N_2$ (314.30), (percent): F, 18.15; N, 8.92. Found (percent): F, 18; N, 9.00.

EXAMPLE 12

4.06 g. (0.02 mole) of N-(5,6,7,8-tetrahydro-1-naphthyl)-formimino ethyl ether and 1.88 g. (0.02 mole) of 3-amino pyridine are reacted by the method described in Example 4. The obtained N-(5,6,7,8-tetrahydro-1-naphthyl)-N'-(3-pyridyl)-formamidine melts at 128–130° C.

*Analysis.*—Calculated for $C_{16}H_{17}N_3$ (251.34), (percent): N, 16.75. Found (percent): N, 16.60.

EXAMPLE 13

10 g. (0.0502 mole) of N-(β-naphthyl)-formimino ethyl ether and 5 g. (0.0503 mole) of cyclohexyl amine are reacted by the method described in Example 4. The obtained N-(β-napthyl)-N'-cyclohexyl-formamidine melts at 130–132° C.

*Analysis.*—Calculated for $C_{17}H_{20}N_2$ (252.35), (percent): N, 11.1. Found (percent): N, 10.95.

EXAMPLE 14

5.9 g. (0.02 mole) of 2-hydroxy-4-sulfo-naphthyl-(1) formimino ethyl ether and 2.32 g. (0.02 mole) of 2-diethyl-aminoethyl amine are refluxed for five hours in 50 ml. of absolute xylene while stirring. After completing the reaction, the formed N-(2-hydroxy-4-sulfo-1-naphthyl)-N'-(2-diethylaminoethyl)-formamidine is separated by filtration; M.P. 124–126° C.

*Analysis.*—Calculated for $C_{17}H_{23}N_3O_4S$ (365.46), (percent): N, 11.52; S, 8.77. Found (percent): N, 11.88; S, 8.78.

EXAMPLE 15

5 g. (0.027 mole) of N-(α-naphthyl)-formimino methyl ether and 3.27 g. (0.027 mole) of α-phenylethyl amine are reacted in absolute toluene by the method described in Example 2. The obtained N-(α-naphthyl)-N'-(2-phenylethyl)-formamidine hydrochloride melts at 174–175° C.

*Analysis.*—Calculated for $C_{19}H_{19}ClN_2$ (310.82), (percent): N, 9.03. Found (percent): N, 0.13.

EXAMPLE 16

A mixture of 11.25 g. (0.05 mole) of N-(α-naphthyl)-formimino n-butyl ether and 6.10 g. (0.0503 mole) of N-ethyl aniline is dissolved in 50 ml. of dichloroethane; the further procedure is similar to that of Example 4. The obtained N-(α-naphthyl)-N'-ethyl-N'-phenyl-formamidine melts at 186–187° C.

*Analysis.*—Calculated for $C_{19}H_{18}N_2$ (274.35), percent): N, 10.02. Found (percent): N, 10.56.

EXAMPLE 17

10 g. (0.054 mole) of N-(α-naphthyl)-formimino methyl ether and 3.97 g. (0.06 mole) of pyrrol are reacted in 120 ml. of absolute dichloroethane for three hours at the boiling point of the solvent, while the formed methanol is distilled off from the reaction mixture. The reaction is completed when the total theoretical amount of the formed methanol is distilled off. The product is subjected to fractional distillation. The obtained N-(α-naphthyl)-pyrryl-(1)-azomethine boils under 2 mm. mercury pressure at 113–115° C.

*Analysis.*—Calculated for $C_{15}H_{12}N_2$ (220.27), (percent): N, 12.73. Found (percent): N, 12.0.

EXAMPLE 18

31.14 g. (0.1 mole) of N-(β-naphthyl)-formimino decyl ether and 9.81 (0.1 mole) of 3-methyl-piperidine are reacted by refluxing in absolute toluene. The solvent is then distilled off and the crude product subjected to fractional distillation. The obtained N-(β-naphthyl)-(3-methyl-1-piperidyl)-azomethine boils under 0.2 mm. mercury pressure at 175–178° C.

*Analysis.*—Calculated for $C_{17}H_{19}N_2$ (251.34), (percent): N, 11.15. Found (percent): N, 11.04.

EXAMPLE 19

13.05 g. (0.05 mole) of N-(β-naphthyl)-formimino benzyl ether and 4.3 g. (0.05 mole) of piperazine are refluxed in absolute benzene solution. The solution is then treated with charcoal while hot. The obtained N-(β-naphthyl)-(1-piperazinyl)-azomethine crystallizes from the cooled solution. The product is solated by filtration; M.P. 170–173° C.

*Analysis.*—Calculated for $C_{15}H_{17}N_3$ (239.33), (percent): N, 17.52. Found (percent): N, 17.03.

What we claim is:

1. A naphthyl or tetrahydronaphthyl formamididine derivative of the formula:

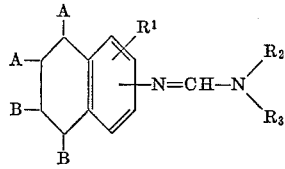

wherein the pairs of symbols A,A and B,B are hydrogen atoms or additional chemical bonds; $R_1$ is hydrogen, halogen, hydroxyl or a sulfonic acid group; $R_2$ and $R_3$ are independently selected from the group consisting of hydrogen, an alkyl group of 2 to 12 carbon atoms, diethylaminoethyl, diethylaminopropyl, cyclohexyl and cyclooctyl; and one of $R_2$ and $R_3$ can be a heterocyclic radical selected from the group consisting of furfuryl, pyridyl, piperidyl, 3-methylpiperidyl, pyrryl, piperazinyl, and hexamethyleneimino or $R_2$ and $R_3$ form, together with the nitrogen to which they are attached, a piperidyl, piperazinyl, pyridyl, pyrryl or azocinyl group; and the therapeutically acceptable acid addition salts thereof.

2. A compound according to claim 1 which is N-α-naphthyl-N'-octyl-formamidine.

3. A therapeutically acceptable acid addition salt of the compound of claim 2.

References Cited

Elsevier: Encyclopeadia of Organic Chemistry, Series III, vol. 12B, pp. 459, 461 and 563 to 564, Elsevier Pub. Co. Inc., New York (1949).

Bredereck et al.: Chem. Ber., vol. 92, p. 846 (1959).

JOHN D. RANDOLPH, Primary Examiner

U.S. Cl. X.R.

260—240, 999